(12) United States Patent
Lung

(10) Patent No.: US 8,717,431 B2
(45) Date of Patent: May 6, 2014

(54) DETECTION APPARATUS AND OBSTACLE DETECTION SYSTEM FOR VEHICLES USING THE SAME

(75) Inventor: Chien-Lih Lung, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 558 days.

(21) Appl. No.: 12/961,676

(22) Filed: Dec. 7, 2010

(65) Prior Publication Data
US 2011/0293138 A1 Dec. 1, 2011

(30) Foreign Application Priority Data

May 26, 2010 (TW) .................. 99116744 A

(51) Int. Cl.
G06K 9/00 (2006.01)
B60R 21/013 (2006.01)
G06T 1/00 (2006.01)
G02B 9/00 (2006.01)

(52) U.S. Cl.
CPC .................. B60R 21/013 (2013.01); G06T 1/00 (2013.01); G02B 9/00 (2013.01)
USPC .......................................... 348/118; 382/103

(58) Field of Classification Search
USPC .......................................... 348/118; 382/103
See application file for complete search history.

(56) References Cited

U.S. PATENT DOCUMENTS 3,252,674 A * 5/1966 Magnus ..................... 250/214.1
5,485,378 A * 1/1996 Franke et al. .................. 701/41
7,365,769 B1 * 4/2008 Mager .......................... 348/113
7,446,650 B2 * 11/2008 Scholfield et al. ............ 340/438
8,139,109 B2 * 3/2012 Schmiedel et al. ........... 348/118
2004/0036586 A1 * 2/2004 Harooni ........................ 340/435
2005/0222753 A1 * 10/2005 Ishikawa ....................... 701/200
2006/0103727 A1 * 5/2006 Tseng ............................ 348/148
2006/0171704 A1 * 8/2006 Bingle et al. .................. 396/419
2007/0182817 A1 * 8/2007 Briggance .................... 348/118
2008/0212215 A1 * 9/2008 Schofield et al. ............ 359/844
2012/0019940 A1 * 1/2012 Lu et al. ....................... 359/819
2012/0320209 A1 * 12/2012 Vico et al. .................... 348/148

* cited by examiner

Primary Examiner — Christopher S Kelley
Assistant Examiner — Asmamaw G Tarko
(74) Attorney, Agent, or Firm — Novak Druce Connolly Bove + Quigg LLP

(57) ABSTRACT

A detection apparatus includes a housing, a circuit board, an image detection module, an ultrasonic detection module, and a connecting terminal. The image detection module includes a barrel, one or more lenses received in the barrel, and an image sensor configured to receive light through the lens and generate image signals. The image sensor is electrically connected to the circuit board. The ultrasonic detection module includes a piezoelectric member fixed to the housing to emit ultrasonic waves and receive reflected ultrasonic waves, and an ultrasonic control module operable to apply a voltage on the piezoelectric member, receive alternating voltages generated by the piezoelectric member, and generate voltage signals when receiving the voltages from the piezoelectric member. The ultrasonic control module is electrically connected to the piezoelectric member and the circuit board. The connecting terminal is electrically connected to the circuit board to output the image signals and the voltage signals.

17 Claims, 4 Drawing Sheets

DETECTION APPARATUS AND OBSTACLE DETECTION SYSTEM FOR VEHICLES USING THE SAME

BACKGROUND

1. Technical Field

The present disclosure generally relates to a detection apparatus, and an obstacle detection system for vehicles using the detection apparatus.

2. Description of Related Art

Various techniques have been utilized in the past to detect the size of an obstacle ahead of a vehicle, the moving direction of the obstacle, and a distance from the vehicle to the obstacle. Generally, an image detection system may be used to detect the image of the obstacle, and a distance detection system may be used to detect the distance between the vehicle and the obstacle. However, the image diction system and the distance detection system are utilized independently, and the distance and the image can not be easily and accurately combined to provide comprehensive information.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
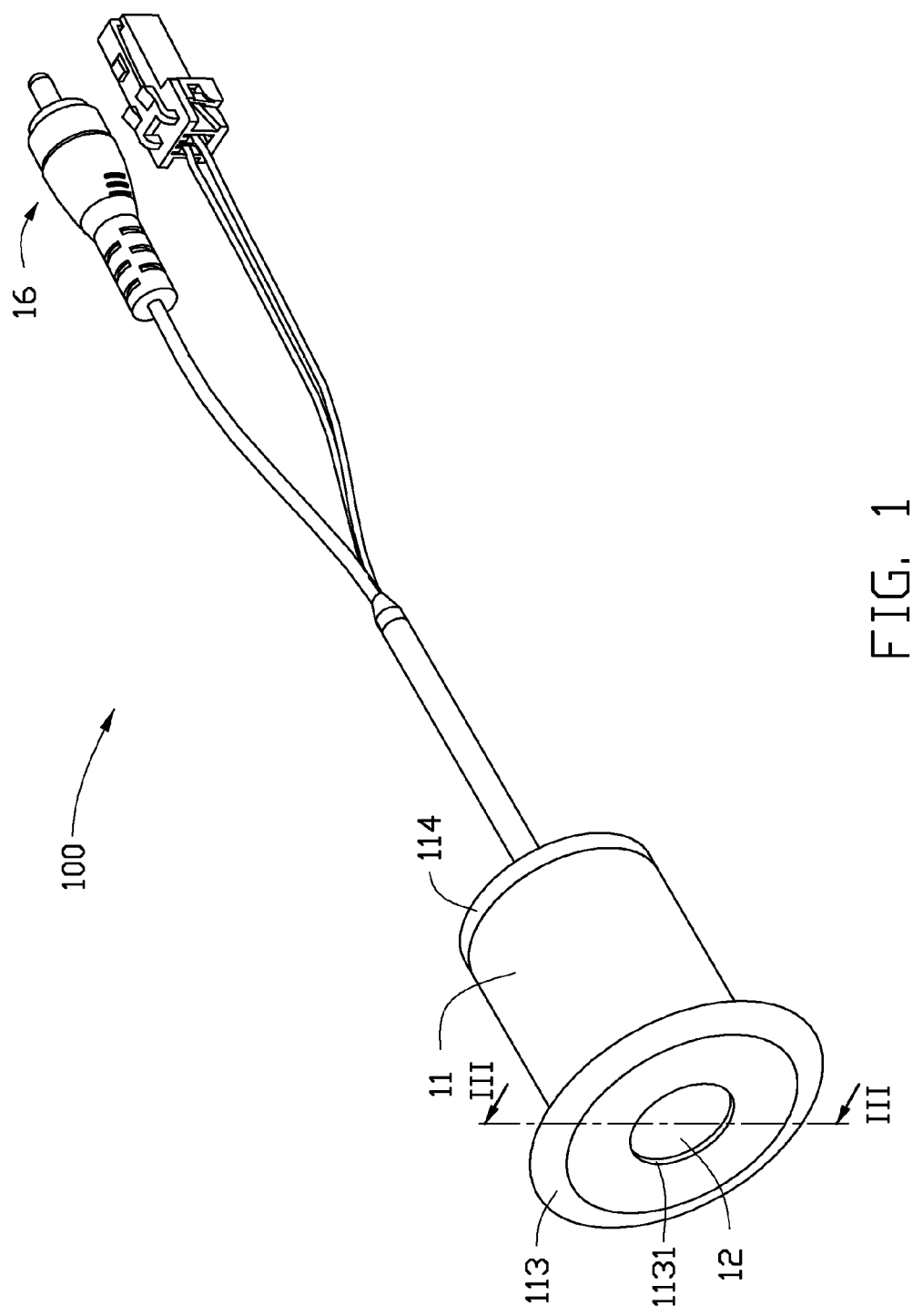
FIG. 1 is an isometric view of one embodiment of a detection apparatus.
Figure 2:
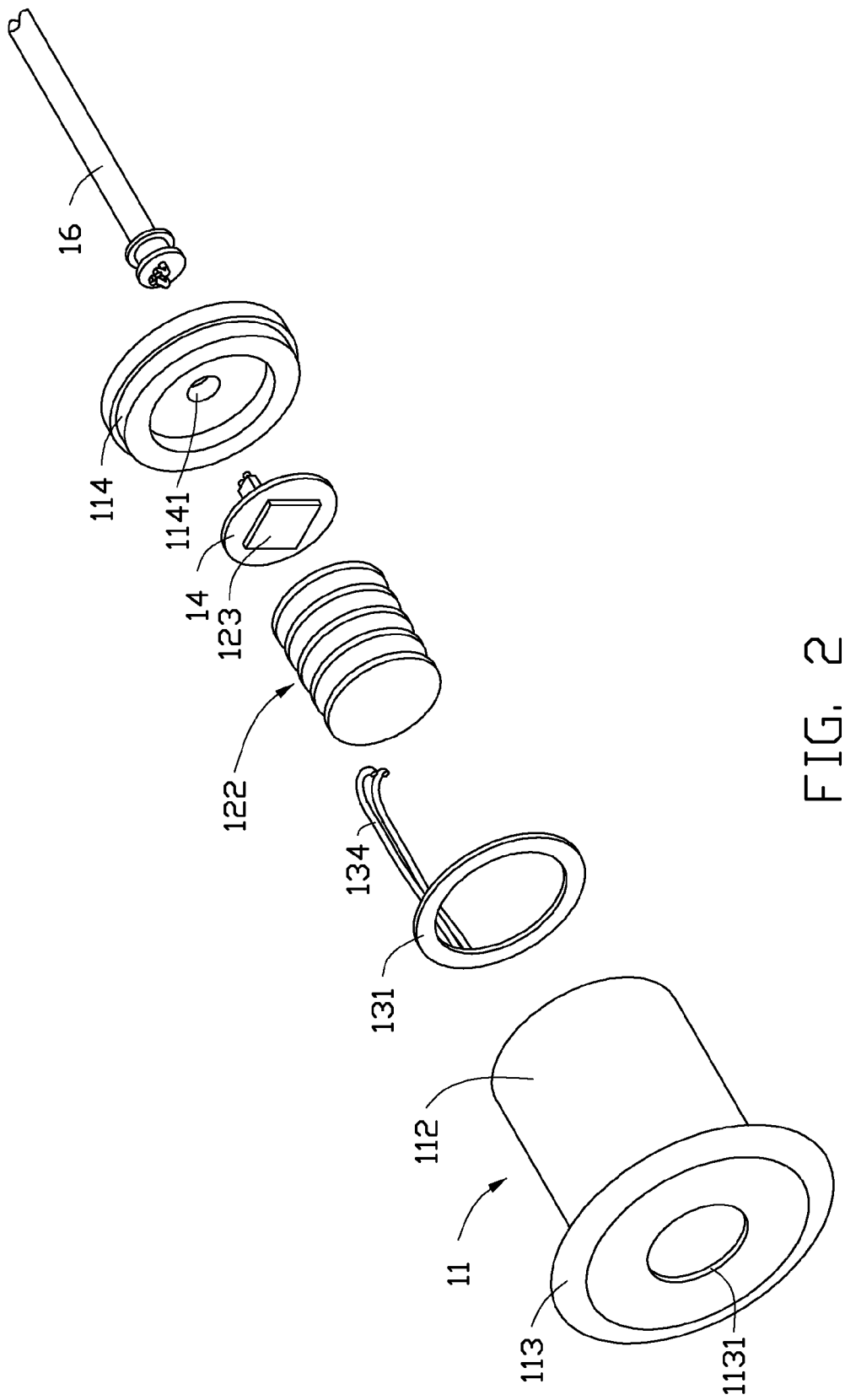
FIG. 2 is an exploded, isometric view of the detection apparatus of FIG. 1.
Figure 3:
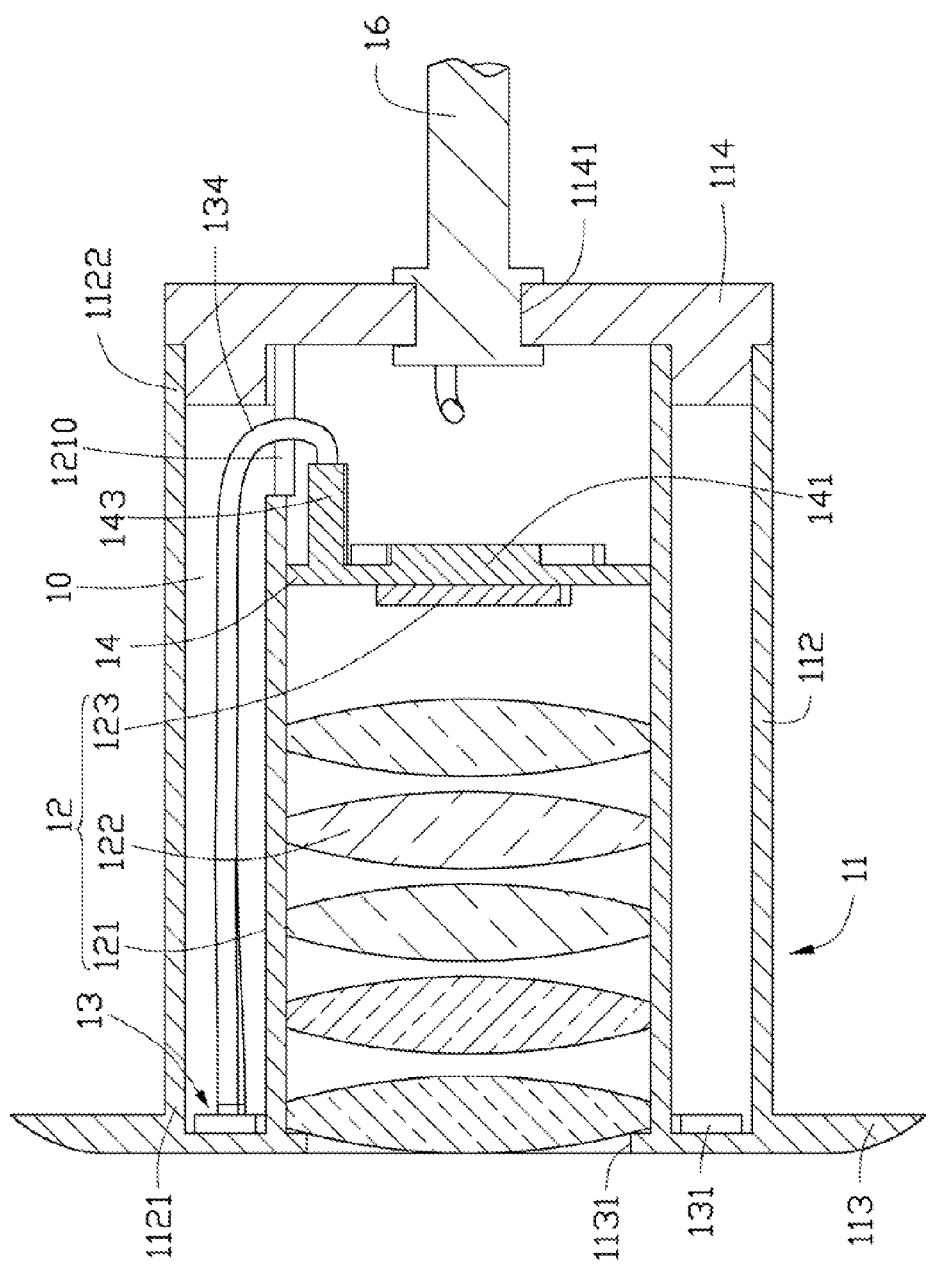
FIG. 3 is a cross-section of the detection apparatus, taken along line III-III in FIG. 1.

Referring to FIGS. 1 through 3, one embodiment of a detection apparatus 100 includes a housing 11, an image detection module 12, an ultrasonic detection module 13, a circuit board 14, and a connecting terminal 16 electrically connected to the circuit board 14. The image detection module 12, the ultrasonic detection module 13, and the circuit board 14 are received in the housing 11.

The housing 11 includes a sleeve 112, a front cover 113 formed on a end 1121 of the sleeve 112, and a rear cover 114 positioned at an opposite second end 1122 of the sleeve 112 opposite to the front cover 113. The front cover 113 is a substantially circular metal sheet with a diameter larger than that of the sleeve 112, and defines a light input hole 1131 in a central portion thereof to allow light to enter into the image detection module 12. The rear cover 114 defines a through hole 1141 to receive the connecting terminal 16.

The image detection module 12 is configured to receive light passing through the light input hole 1131 and generate a plurality of image signals. The image detection module 12 includes a barrel 121, one or more lenses 122 received in the barrel 121, and an image sensor 123 configured to receive light from the lenses 122 and to generate the image signals. The image sensor 123 is received in the barrel 121.

In the illustrated embodiment, the barrel 121 is integrally formed with the front cover 113 and extends from the inner circumference of the light input hole 1131 toward the rear cover 114. The barrel 121 is received in, parallel to and apart from the sleeve 112. A ring-shaped receiving space 110 is formed between the barrel 121 and the sleeve 112. The barrel 121 defines a cutout 1210 at a distal end thereof. The circuit board 14 is received in the barrel 121. The image sensor 123 is positioned on the circuit board 14 and faces the front cover 123. The image sensor 123 is electrically connected to the circuit board 14.

The ultrasonic detection module 13 includes a piezoelectric member 131 fixed to the housing 11 to emit a plurality of ultrasonic waves and receive the reflected ultrasonic waves, and an ultrasonic control module 143 electrically connecting the piezoelectric member 131 and the circuit board 14. The ultrasonic control module 143 is positioned on the circuit board 14 and faces the rear cover 114. That is, the image sensor 123 and the ultrasonic control module 143 a positioned at opposite sides of the circuit board 14.

The piezoelectric member 131 may be made of piezoelectric ceramic and is received in the receiving space 110. In the illustrated embodiment, the piezoelectric member 131 is annular, adhered to the front cover 113 and disposed around the light input hole 1131 and the barrel 121. The piezoelectric member 131 is electrically connected to the ultrasonic control module 143 via a plurality of wirings 134 passing through the cutout 1210 and the receiving space 110.

The ultrasonic control module 143 is operable to apply a high-frequency voltage on the piezoelectric member 131, which in turn applies alternating mechanical pressure on the front cover 113 to emit the ultrasonic waves. When the emitted ultrasonic waves are reflected by an obstacle and received by the piezoelectric member 131, an alternating voltage is generated and transmitted to the ultrasonic control module 143 via the wirings 134. The ultrasonic control module 143 is operable to receive the alternating voltages and generate a plurality of voltage signals.

The connecting terminal 16 is configured to output the image signals from the image detection module 12 and the voltage signals from the ultrasonic control module 143 to a control module of a vehicle, such as a body control module (BCM) which is capable of displaying the image of an obstacle and a distance between the vehicle and the obstacle in response to the image signals and the voltage signals.

Because the image detecting modules 12 and the ultrasonic detection module 13 are sealed in the sleeve 112, the detection apparatus 100 can present a more compact overall dimension and of highly precise detection, and preventing contaminants and moisture from entering the sleeve 112.

Figure 4:
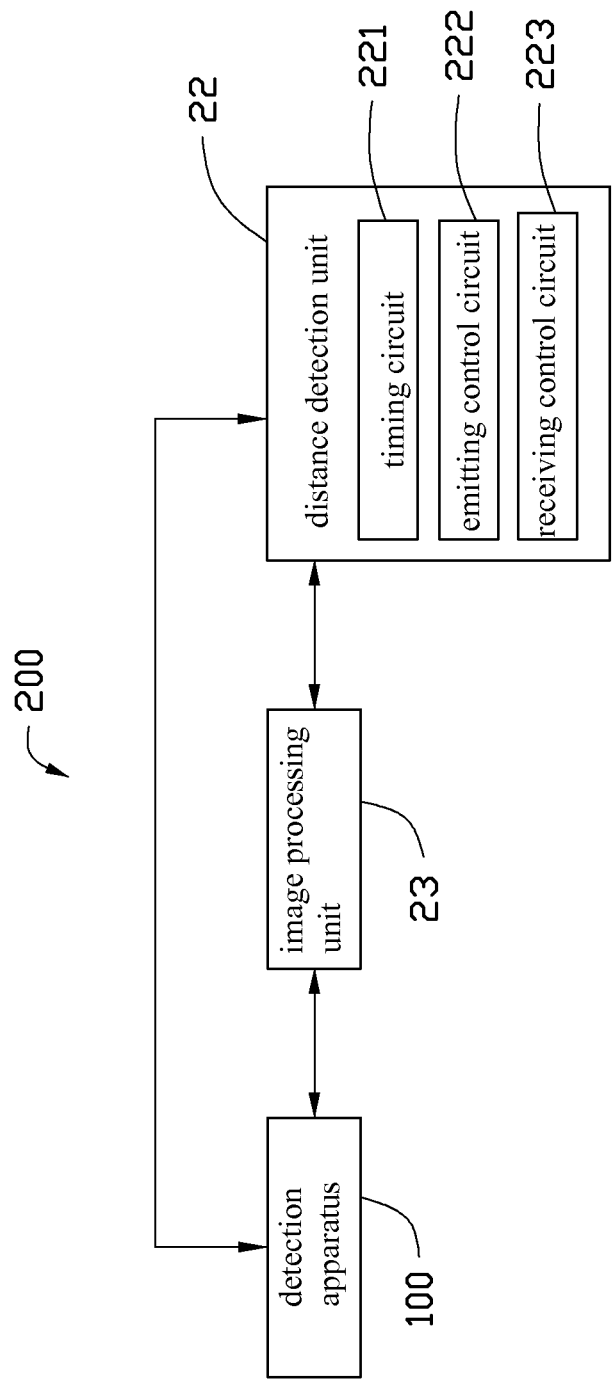
FIG. 4 is a functional block diagram of one embodiment of an obstacle detection system for vehicles using the detection apparatus of FIG. 1.

Referring also to FIG. 4, one embodiment of an obstacle detection system 200 for a vehicle includes the detection apparatus 100, a distance detection unit 22, and an image processing unit 23. The distance detection unit 22 electrically connects the detection apparatus 100 and the image processing unit 23, and is configured to direct the ultrasonic detection module 13 to emit the ultrasonic waves and to receive the reflected ultrasonic waves, and to receive the voltage signals from the ultrasonic control module 143.

The distance detection unit 22 includes a timing circuit 221 to detect a delay time between emission of the ultrasonic waves from the detection apparatus 100 and reception of the returning reflected waves thereof, an emitting control circuit 222 to activate the ultrasonic control module 143 to apply a voltage on the piezoelectric member 131, and a receiving control circuit 223 to detect the voltage signals from the ultrasonic control module 143.

The image processing unit 23 is electrically connected to the detection apparatus 100 and the distance detection unit 22, processes the image signals and the distance values, and simultaneously displays the images of the obstacles and the distance values on a screen.

In use, the obstacle detection system 200 can be selectively mounted on various positions of a vehicle, such as ahead of the vehicle, overhead on the vehicle, or the rear of the vehicle, so as to suit different requirements.

It is believed that the present embodiments and their advantages will be understood from the foregoing description, and it will be apparent that various changes may be made thereto without departing from the spirit and scope of the disclosure or sacrificing all of its material advantages.

The invention claimed is:

1. A detection apparatus comprising:
   a housing comprising a sleeve, a front cover formed on a first end of the sleeve, and a rear cover positioned on an opposite second end of the sleeve, the front cover defining a light input hole;
   an image detection module comprising:
      a barrel received in the sleeve and apart from the sleeve, the barrel surrounding the light input hole;
      at least one lens received in the barrel; and
      an image sensor received in the barrel and configured to receive light from the at least one lens and generate a plurality of image signals;
   an ultrasonic detection module comprising:
      a piezoelectric member fixed to the housing and arranged between the barrel and the sleeve, the piezoelectric member is configured to emit a plurality of ultrasonic waves and receive the reflected ultrasonic waves; and
      an ultrasonic control module operable to apply a voltage on the piezoelectric member, receive the voltages generated by the piezoelectric member, and generate a plurality of voltage signals when receiving the voltages from the piezoelectric member;
   a circuit board received in the barrel, the image sensor positioned on the circuit board and facing the front cover, the ultrasonic control module positioned on the circuit board and facing the rear cover; and
   a connecting terminal electrically connected to the circuit board to output the image signals and the voltage signals, wherein the image sensor is electrically connected to the circuit board, and the ultrasonic control module is electrically connected to the piezoelectric member and the circuit board.

2. An obstacle detection system for vehicles, comprising:
   a detection apparatus comprising:
      a housing comprising a sleeve, a front cover formed on a first end of the sleeve, and a rear cover positioned on an opposite second end of the sleeve, the front cover defining a light input hole;
      an image detection module comprising:
         a barrel received in the sleeve and apart from the sleeve, the barrel surrounding the light input hole;
         at least one lens received in the barrel; and
         an image sensor received in the barrel and configured to receive light from the at least one lens and generate a plurality of image signals;
      an ultrasonic detection module comprising:
         a piezoelectric member fixed to the housing and arranged between the barrel and the sleeve, the piezoelectric member is configured to emit a plurality of ultrasonic waves and receive the reflected ultrasonic waves; and
         an ultrasonic control module operable to apply a voltage on the piezoelectric member, receive the voltages generated by the piezoelectric member, and generate a plurality of voltage signals when receiving the voltages from the piezoelectric member;
      a circuit board received in the barrel, the image sensor positioned on the circuit board and facing the front cover, the ultrasonic control module positioned on the circuit board and facing the rear cover;
      a connecting terminal electrically connected to the circuit board to output the image signals and the voltage signals;
   a distance detection unit configured to calculate a distance value between the vehicle and one or more obstacles, the distance detection unit comprising:
      a timing circuit to detect a delay time between emission of the ultrasonic waves from the detection apparatus and reception of the returning reflected waves thereof,
      an emitting control circuit to activate the ultrasonic control module to apply a voltage on the piezoelectric member, and
      a receiving control circuit to detect the voltage signals from the ultrasonic control module; and
   an image processing unit electrically connected to the detection apparatus and the distance detection unit to display the images of the obstacles and the distance values, wherein the image sensor is electrically connected to the circuit board, and the ultrasonic control module is electrically connected to the piezoelectric member and the circuit board.

3. The obstacle detection system of claim 2, wherein the image processing unit is configured to display the images of the obstacles and the distance values simultaneously.

4. The detection apparatus of claim 1, wherein the barrel is integrally formed with the front cover and extends from an inner circumference of the light input hole toward the rear cover.

5. The detection apparatus of claim 1, further comprising a plurality of wirings, wherein the barrel is parallel to the sleeve and defines a cutout at a distal end thereof a receiving space is formed between the barrel and the sleeve, the piezoelectric member is received in the receiving space, the wirings pass through the cutout and the receiving space and connect the piezoelectric member to the ultrasonic control module.

6. The detection apparatus of claim 5, wherein the piezoelectric member is annular and is disposed around the light input hole and the barrel.

7. The detection apparatus of claim 6, wherein the piezoelectric member is adhered to the front cover.

8. The detection apparatus of claim 7, wherein the front cover is substantially a metal sheet having a diameter larger than that of the sleeve, and the light input hole is defined in a central portion of the front cover to allow light to enter into the image detection module.

9. The detection apparatus of claim 8, wherein the rear cover defines a through hole to receive the connecting terminal.

10. The detection apparatus of claim 7, wherein the piezoelectric member is made of piezoelectric ceramic.

11. The obstacle detection system of claim 2, wherein the barrel is integrally formed with the front cover and extends from an inner circumference of the light input hole toward the rear cover.

12. The obstacle detection system of claim 11, further comprising a plurality of wirings, wherein the barrel is parallel to the sleeve and defines a cutout at a distal end thereof, a receiving space is formed between the barrel and the sleeve, the piezoelectric member is received in the receiving space, the wirings pass through the cutout and the receiving space and connect the piezoelectric member to the ultrasonic control module.

13. The obstacle detection system of claim 12, wherein the piezoelectric member is annular and is disposed around the light input hole and the barrel.

14. The obstacle detection system of claim 13, wherein the piezoelectric member is adhered to the front cover.

15. The obstacle detection system of claim 14, wherein the front cover is substantially a metal sheet having a diameter larger than that of the sleeve, and the light input hole is defined in a central portion of the front cover to allow light to enter into the image detection module.

16. The obstacle detection system of claim 15, wherein the rear cover defines a through hole to receive the connecting terminal.

17. The obstacle detection system of claim 14, wherein the piezoelectric member is made of piezoelectric ceramic.

* * * * *